Dec. 24, 1957     J. F. SCHWAN ET AL     2,817,281
AIR-CIRCULATING PARASOL FOR PROTECTION
AGAINST DUST, INSECTS AND SUN
Filed July 12, 1954
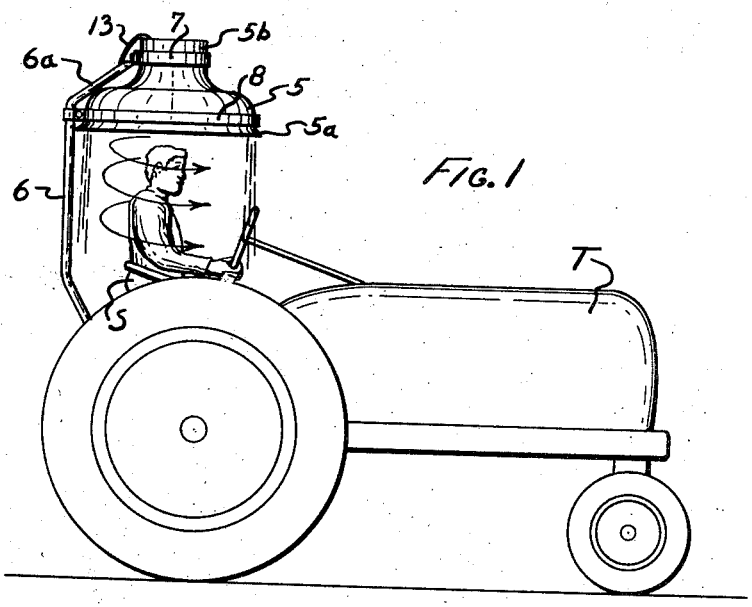
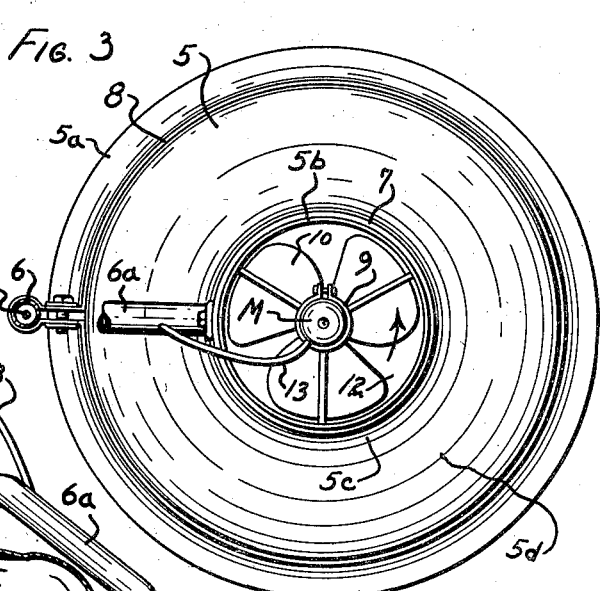
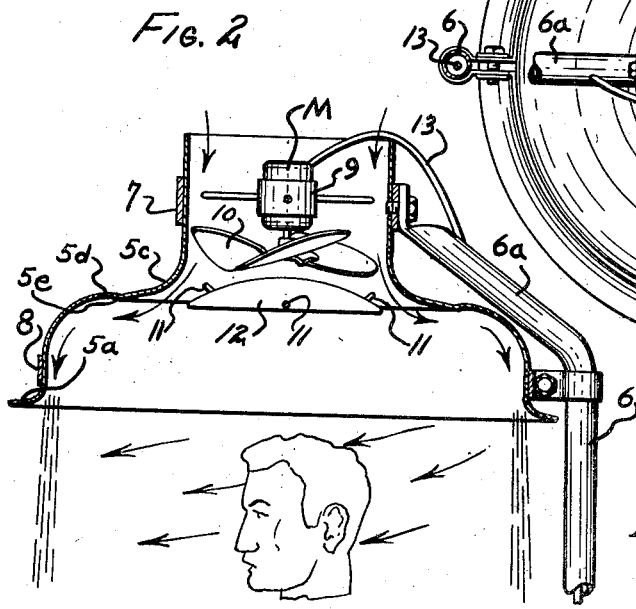
INVENTOR
CLYDE W. OLSON
JOSEPH F. SCHWAN
BY Williamson, Williamson,
Schroeder & Adams
ATTORNEYS

United States Patent Office 2,817,281
Patented Dec. 24, 1957

2,817,281

AIR-CIRCULATING PARASOL FOR PROTECTION AGAINST DUST, INSECTS AND SUN

Joseph F. Schwan, St. Paul, and Clyde W. Olson, Minneapolis, Minn.

Application July 12, 1954, Serial No. 442,692

4 Claims. (Cl. 98—1)

This invention relates to an overhead air-circulating device which will provide protection for a person seated or standing thereunder from dust, insects and sun.

The invention, while capable of wide general use to provide such protection, is particularly adapted for mounting and use upon farm vehicles, sulkies, plows and the like to protect the driver or operator from dirt, dust, sun glare and even rain.

The prior art, while showing fan attachments, air-parasols and so forth for vehicles, bicycles, baby carriages and the like, fails to disclose an efficient protective device of the class described which will provide a cylindrical vortex of descending air surrounding the head and shoulders of a person while nevertheless preventing drafts of air upon the head and shoulders of the person benefited.

It is an object of our present invention to provide a simple and substantially improved air-circulating parasol or canopy of substantial area for covering the head and shoulders of a person and which will very efficiently set up a well defined cylindrical vortex of air spaced from and surrounding the person and thereby shielding that person from flying insects, dirt, dust and light rain.

A further object is the provision of a device of the class described capable of wide general use but particularly adapted for the drivers of farm vehicles, plows and so forth wherein, through close cooperative relationship of essential parts, a protective downward vortex is produced disposed in spaced relation throughout to the head and shoulders of the person seated beneath the device thereby eliminating drafts of air upon the sensitive portions of the operator.

Another object is the provision of a compact, ornate device of the class described wherein a large integral hood or parasol, through novel features of construction and in cooperation with a peculiar deflector and fan, is responsible for new and substantially improved results contrasted with devices of the prior art.

These and other objects and advantages of our invention will more fully appear from the following description made in connection with the accompanying drawings wherein like reference characters refer to the same parts throughout the several views and in which:

Fig. 1 is a side elevation showing an embodiment of our invention applied to a conventional tractor;

Fig. 2 is a vertical section taken axially through the device, the arrows and dotted lines indicating flow of the descending, vortex air currents; and Fig. 3 is a top plan view of the device.

Referring now to the embodiment of our air-circulating parasol illustrated in the drawings, the device is shown mounted upon the rear of a conventional tractor T and above the driver's seat S thereof. Our structure includes, as an essential part, a large symmetrical hood 5 having a lower open skirt 5a of a diameter substantially greater than the maximum cross-sectional thickness of a human body. A diameter approaching 36 inches is found highly efficient although it will, of course, be understood that the dimensions may be substantially varied all within the scope of our invention. Hood 5 has, as shown, an open, reduced upper portion 5b of substantially cylindrical shape.

Suitable, upstanding means such as a standard 6 is provided for supporting and positioning the hood 5 in a spaced overhead relation to the driver or operator of the tractor with efficient clearance between the top of the driver's head and the edge of skirt 5a to permit the driver to readily mount his tractor seat without danger of striking the hood. Standard 6 may be secured at its lower end by any suitable means such as a rugged clamp to the rear portion or transmission housing at the rear of the tractor and the upper end 6a of this standard is preferably bent inwardly terminating in a position close to the upper end 5b of the hood and, as shown, a clamping ring 7 secures the upper end of the hood to said standard extremity. If desired, a second split clamping ring 8 may surround the lower portion of the hood being securely affixed, as shown in Fig. 3, to the upper portion of standard 6.

Within the upper portion 5b of the hood, an electric fan motor M is axially mounted, as shown, being supported from the hub of a spider 9, the arms of which, at their outer ends, are welded or otherwise rigidly secured to the inner periphery of hood section 5b. An efficient fan 10 as shown, of the three-bladed type, is affixed to the lower end of the armature shaft of motor M and is disposed just above or substantially at the level of the upper portion of the annular shoulder 5c formed internally of hood 5 by the substantially, cross-sectionally arcuate initial flaring of the hood. The maximum diameter of fan 10 is such as to preferably give about half an inch clearance from the internal cylindrical wall of hood section 5b. Directly below fan 10 and disposed axially of the hood 5 we mount, from suitable supports such as metal straps 11, a partial, spherical deflector 12 which may be constructed of sheet metal, plastic or the like, the convex surface thereof being upward and being symmetrically disposed with reference to the hood.

To obtain our efficient results in the production of a downward cylindrical vortex of air, it is important that the deflector 12 have a particular predetermined relation with the upper, diminished portion 5b of the hood and with the rounded internal annular shoulder 5c. The maximum diameter of deflector 12 is preferably similar or very slightly greater than the diameter of fan 10. The peripheral edge of deflector 12 is preferably disposed in a spaced relationship to the medial zone line of internal annular shoulder 5c so that the shortest distance between the peripheral edge and said zone line is measured along a line extending normal to the annular rounded shoulder, as will be evident from inspection of Fig. 3. In actual practice, we have found that the spaced relationship should be in the neighborhood of ¾–1 inch to produce the best results, although, of course, this may be varied reasonably all within the scope of our invention.

It will be noted (see Fig. 2) that the hood from the internal shoulder 5c flares outwardly then, for a narrow zone, is curved upwardly to define a zone 5d which defines, internally of the hood, a slightly offset annular chamber 5e. The hood 5 thereafter extends downwardly along substantially an arcuate curve and then is flared outwardly at its skirt extremity.

An electric service cord 13 having conductors therein electrically connected with the motor is, of course, supplied, being preferably clipped at its descending portion by a clip 14 to the upper portion of standard 6. Current may be supplied from the storage battery of the tractor or any other suitable source.

In operation with the driver positioned as shown in Fig. 1 beneath the hood, fan 10 is driven by the motor producing rapid displacement and circulation of air downwardly in a vortex through the cooperating effect of the cylindrical portion 5b of the hood, annular shoulder 5c and the partial spherical deflector 12. This rapid circulation of air spreads outwardly in spiral form being further effected by the offset internal chamber 5e at the lower portion of the hood and is then effected by the downwardly extending skirt portion. The result is the production of a relatively thin rapid cylindrical vortex of air as indicated by the dotted lines and arrows in Figs. 1 and 2. This vortex is well spaced from the head and shoulders of the driver and does not impinge against those portions of his body. The spiral travel of the air is effected by the rotary motion of the multi bladed fan 10 in cooperation with the shoulder 5c and the convex, cooperating deflector 12 disposed just below the base of the diminished portion 5b of the hook. Rather unexpected results are attained in the inherent combination of the widely flared, enlarged skirt portion of the hood 5. The result is that air is delivered rapidly in a downward direction with a relatively slower spiraling movement as indicated by the arrows. In this connection, the slightly offset, internal chamber 5e at the lower portion of the hood has been found effective to increase efficiency of downward direction of a cylindrical curtain of air as contrasted with a widely divergent conical or outward flow of air.

This vortex provides a spirally descending air curtain which effectively shields the driven from dust, dirt, flying insects and even light rain. It, of course, also has a cooling effect through rapid circulation and evaporation of moisture particles which necessarily occur. The rapidly rotating fan, deflector 12 and flared portion of the parasol-hood 5 shield the driver's head and torso from sun rays.

While the invention, as shown, is attached to a farm vehicle such as a tractor, it will be evident that our device is equally applicable for wide general use in stationary installations where it is desired to shield a person from sun, heat, dust and insects.

It will, of course, be understood that various changes may be made in the form, details, arrangement and proportions of the parts without departing from the scope of our invention.

What we claim is:

1. An air-circulating parasol of the class described comprising an enlarged, overhead hood having means for supporting the same in a predetermined position, said hood having a substantially cylindrical and diminished upper portion and flaring out widely below said upper portion and producing an internal rounded shoulder and then flaring outwardly and then turned downwardly to form an annular substantially vertical skirt of substantial circumference in contrast to the circumference of said upper portion, the connection between said upper portion and skirt including an internally convex, annular shoulder merging into a slightly upwardly offset, annular hood portion disposed above said vertical skirt portion, a rotary fan mounted axially within said upper portion for circulating air downwardly, means for driving said fan and a deflector having a symmetrical, generally convex upper surface with a circular peripheral edge disposed in spaced relation to the annular portion between the annular shoulder connecting the upper and skirt portions of said hood.

2. An air-circulating parasol of the class described comprising, an enlarged, overhead hood having means for supporting the same in a predetermined position, said hood having a substantially cylindrical and diminished upper portion and flaring out widely below said upper portion and producing an internal, rounded shoulder and then flaring outwardly and then turned downwardly to form an annular, generally cylindrical skirt of substantial circumference in contrast to the circumference of said upper portion, a driven, rotary fan mounted axially within said substantially cylindrical upper hood portion for circulating air downwardly and a deflector having a closed, symmetrical, generally convex upper surface opposed to the discharge of said fan and having a circular peripheral edge disposed in spaced relation to said internal, rounded shoulder.

3. An air-circulating parasol for producing a protective, generally tubular downwardly moving vortex of air comprising, an enlarged, overhead hood having means for supporting the same in a predetermined position, said hood having an upper, diminished section of open, substantially cylindrical construction and having a depending skirt of substantially enlarged diameter as contrasted with said upper section and of a diameter in excess of three times the maximum diameter of the crown of an average human head, said skirt being substantially coaxial with said upper section and having a generally cylindrical, depending interior, said skirt being interconnected with and communicating with said upper section through the medium of a flaring connecting portion and said connecting portion defining an internal, annular, rounded shoulder, a driven rotary fan mounted axially within said upper section for circulating air downwardly and a deflector having a closed, substantially semispherical upper surface opposed to the discharge of said fan and having a circular peripheral edge disposed in spaced relation to said internal, rounded shoulder, the diameter of said peripheral edge being approximately equal to the diameter of said upper section and said edge being disposed above the cylindrical depending portion of said skirt.

4. The structure set forth in claim 3 wherein the shortest distance between any part of said deflector and said hood is along a line extending normal to said rounded shoulder.

References Cited in the file of this patent

UNITED STATES PATENTS

| | | |
|---|---|---|
| 2,557,235 | Schoth | June 19, 1951 |
| 2,627,217 | Hainke et al. | Feb. 3, 1953 |
| 2,640,411 | Hans | June 2, 1953 |

FOREIGN PATENTS

| | | |
|---|---|---|
| 375,862 | Great Britain | July 4, 1942 |